United States Patent
Cafarelli et al.

(10) Patent No.: US 6,760,845 B1
(45) Date of Patent: Jul. 6, 2004

(54) CAPTURE FILE FORMAT SYSTEM AND METHOD FOR A NETWORK ANALYZER

(75) Inventors: Dominick A. Cafarelli, Ossinging, NY (US); Kazim O. Yildiz, Wayne, NJ (US)

(73) Assignee: Networks Associates Technology, Inc., Santa Clara, CA (US)

( * ) Notice: Subject to any disclaimer, the term of this patent is extended or adjusted under 35 U.S.C. 154(b) by 153 days.

(21) Appl. No.: 10/071,572

(22) Filed: Feb. 8, 2002

(51) Int. Cl.[7] .......................... G06F 11/30; G06F 12/14
(52) U.S. Cl. ........................................ 713/201; 713/200
(58) Field of Search ............................................ 713/201

(56) References Cited

U.S. PATENT DOCUMENTS

| | | | | |
|---|---|---|---|---|
| 5,241,594 A | | 8/1993 | Kung ............................... 380/4 |
| 5,781,729 A | | 7/1998 | Baker et al. ............. 395/200.6 |
| 5,781,735 A | * | 7/1998 | Southard .................... 709/224 |
| 5,793,954 A | | 8/1998 | Baker et al. ............. 395/200.8 |
| 6,000,041 A | | 12/1999 | Baker et al. ................... 714/39 |
| 6,161,137 A | | 12/2000 | Ogdon et al. ................ 709/224 |
| 6,253,337 B1 | * | 6/2001 | Maloney et al. ............... 714/38 |
| 6,266,700 B1 | | 7/2001 | Baker et al. ................. 709/230 |
| 6,327,620 B1 | * | 12/2001 | Tams et al. ................. 709/224 |
| 6,453,345 B2 | * | 9/2002 | Trcka et al. ................. 709/224 |
| 6,675,209 B1 | * | 1/2004 | Britt ........................... 709/224 |
| 2001/0039579 A1 | | 11/2001 | Trcka et al. ................. 709/224 |
| 2002/0080888 A1 | | 6/2002 | Shu et al. .................... 375/295 |
| 2002/0120874 A1 | | 8/2002 | Shu et al. .................... 713/201 |
| 2003/0084020 A1 | | 5/2003 | Shu ............................... 707/1 |

* cited by examiner

*Primary Examiner*—Gilberto Barrón
*Assistant Examiner*—Grigory Gurshman
(74) *Attorney, Agent, or Firm*—Silicon Valley IP Group, PC; Kevin J. Zilka; Christopher J. Hamaty

(57) ABSTRACT

A system, method and computer program product are provided for analyzing a network. Initially, network traffic information relating to network traffic is collected. Next, the network traffic information is encrypted. In use, the network traffic information is capable of being analyzed by a network analyzer adapted for decrypting the network traffic information.

26 Claims, 6 Drawing Sheets

CAPTURE FILE FORMAT SYSTEM AND METHOD FOR A NETWORK ANALYZER

FIELD OF THE INVENTION

The present invention relates to network analyzers, and more particularly to capture file formats.

BACKGROUND OF THE INVENTION

Network assessment tools referred to as "analyzers" are often relied upon to analyze networks communications at a plurality of layers. One example of such analyzers is the Sniffer® device manufactured by Network Associates®, Inc. Analyzers have similar objectives such as determining why network performance is slow, understanding the specifics about excessive traffic, and/or gaining visibility into various parts of the network.

In use, network analyzers often take the form of a program that monitors and analyzes network traffic, detecting bottlenecks and problems. Using this information, a network manager can keep traffic flowing efficiently. A network analyzer can also be used legitimately or illegitimately to capture data being transmitted on a network. For example, a network router reads every packet of data passed to it, determining whether it is intended for a destination within the router's network or whether it should be passed further along the Internet. A router with a network analyzer, however, may be able to read the data in the packet as well as the source and destination addresses. It should be noted that network analyzers may also analyze data other than network traffic. For example, a database could be analyzed for certain kinds of duplication, etc.

One problem with prior art network analyzers is that such products currently employ "import" and "export" filters to allow such network analyzers to read and write capture file formats of other existing and legacy network analyzers. In particular, import filters import network traffic information into the latest network analyzer-compatible capture file format, the CAP file format. The CAP file format is used by the current versions of the network analyzers. On the other hand, output filters create legacy capture file formats by converting the CAP file format to formats compatible with older network analyzers. The legacy formats include extensions such as .ATC, .ENC, .TRC, .SYC, etc. Third party vendors may then use these legacy formats to exchange data between their products and the network analyzers that handle only the CAP file format.

These import and export filters thus allow third party network analyzers to utilize captured information without relying on the proprietary network analyzer that collected and stored the captured information in a specified file format (i.e. CAP file format). This results in an economic disadvantage for those that manufacture and sell such proprietary network analyzers. Further, security issues arise as a result of this easily read information being readily available to any network analyzer.

There is thus a need for a solution which provides controlled exchange of data between proprietary network analyzers and other third party tools.

DISCLOSURE OF THE INVENTION

A system, method and computer program product are provided for analyzing a network. Initially, network traffic information relating to network traffic is collected. Next, the network traffic information is encrypted. In use, the network traffic information is capable of being analyzed by a network analyzer adapted for decrypting the network traffic information.

In one embodiment, the network traffic information may include total packet information relating to a total number of packets associated with the network traffic, total byte information relating to a total number of bytes associated with the network traffic, and/or network utilization information relating to network utilization associated with the network traffic.

In another embodiment, the network traffic information may be compressed. Further, such network traffic information may be compressed before being encrypted. As an option, the network traffic information may include a format including a compression header having a compression algorithm field with a compression algorithm used for compressing the network traffic information. Such compression header may further include a compression parameter field, pre-compression buffer size field, post-compression buffer size field, compression time field, and/or reserved field.

In still another embodiment, the encrypted network traffic information may be written to memory. When analysis is to occur, the encrypted network traffic information may be read from the memory and decrypted utilizing the network analyzer capable of decrypting the network traffic information.

As an option, the network traffic information may be encrypted utilizing one of a plurality of keys. Further, the network traffic information may include a format including an encryption header having an encryption field with an encryption algorithm used for encrypting the network traffic information. Such encryption header may further include a key number field, a key length field, a block size field, a pre-encryption buffer length field, a post-encryption buffer length field, a compressed indicator field, a buffer encryption field, an encryption time field, and/or reserved field.

Optionally, an indication may be received from a user as to whether the network traffic information is to be compressed. Upon receiving the indication from the user to compress the network traffic information, the network traffic information may be compressed.

From the perspective of a network analyzer used to analyze the encrypted network traffic information, the encrypted network traffic information is initially read from memory. Thereafter, the network traffic information is optionally decompressed, and then decrypted. Finally, the network traffic information is analyzed.

To accomplish this, a data structure may be stored in a computer readable medium. Such data structure may include a data object for containing encrypted network traffic information relating to network traffic. Associated therewith is an encryption object for describing the encryption of the network traffic information in the data object.

The present techniques thus prevent unauthorized interchange of files of network traffic information between proprietary network analyzers and third party network analyzers. This is accomplished by optionally compressing and always encrypting such files before writing them to memory. When the file is read from memory, it is decrypted and optionally decompressed before being used. A software module in the form of a DLL or the like may be used to accomplish this. Such software module may be incorporated into designated network analyzer products, and may also provide read and/or write access to the network traffic information to authorized third party tools.

DESCRIPTION OF THE PREFERRED EMBODIMENTS

Figure 1:
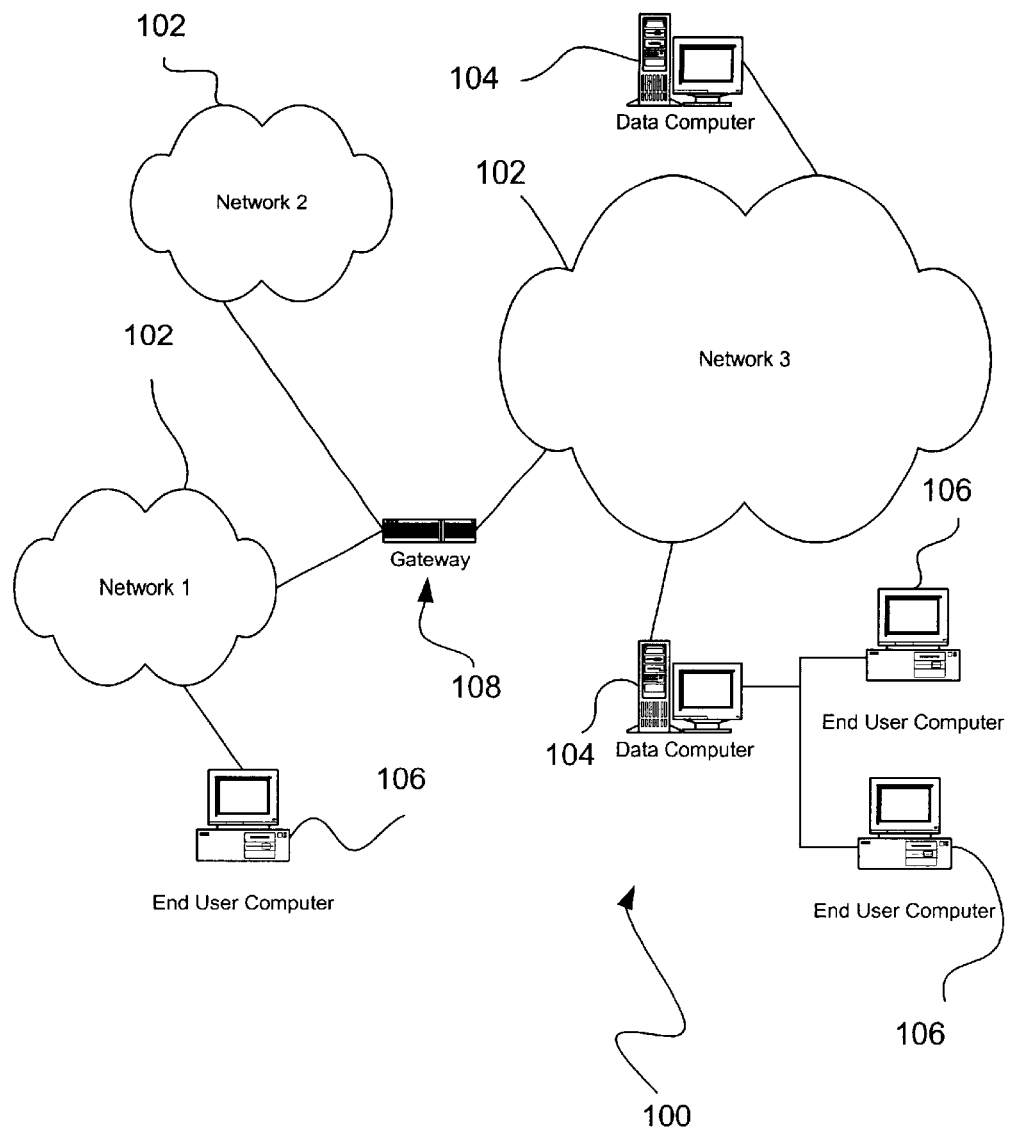
FIG. 1 illustrates an exemplary network environment, in accordance with one embodiment.

FIG. 1 illustrates a network architecture 100, in accordance with the one embodiment. As shown, a plurality of networks 102 is provided. In the context of the present network architecture 100, the networks 102 may each take any form including, but not limited to a local area network (LAN), a wide area network (WAN) such as the Internet, etc.

Coupled to the networks 102 are data servers 104 which are capable of communicating over the networks 102. Also coupled to the networks 102 and the data servers 104 is a plurality of end user computers 106. In the context of the present description, such end user computers 106 may include a web server, desktop computer, lap-top computer, hand-held computer, printer or any other type of hardware/software.

In order to facilitate communication among the networks 102, at least one gateway 108 is coupled therebetween. It should be noted that each of the foregoing network devices as well as any other unillustrated devices may be interconnected by way of a plurality of network segments. In the context of the present description, a network segment includes any portion of any particular network capable of connecting different portions and/or components of a network.

Resident on any of the foregoing components may be a network assessment tool such as a network analyzer. Such network analyzer may be relied upon to analyze networks communications at a plurality of layers. One example of such analyzer is the Sniffer® device manufactured by Network Associates®, Inc. In use, the analyzer may collect information for the purpose of determining why network performance is slow, understanding the specifics about excessive traffic, and/or gaining visibility into various parts of the network.

Figure 2:
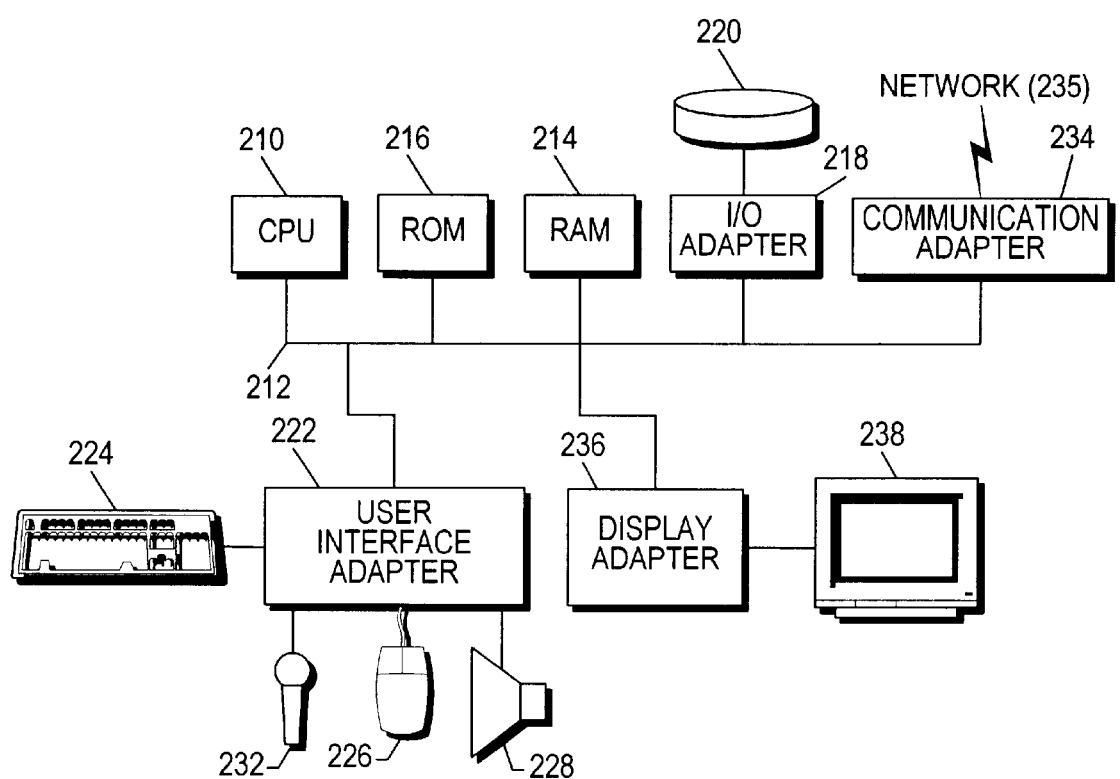
FIG. 2 shows a representative hardware environment associated with the computers of FIG. 1.

FIG. 2 shows a representative hardware environment that may be associated with the data servers 104 and/or end user computers 106 of FIG. 1, in accordance with one embodiment. Such figure illustrates a typical hardware configuration of a workstation in accordance with a preferred embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, a communication adapter 234 for connecting the workstation to a communication network 235 (e.g., a data processing network) and a display adapter 236 for connecting the bus 212 to a display device 238.

The workstation may have resident thereon an operating system such as the Microsoft Windows NT or Windows/95 Operating System (OS), the IBM OS/2 operating system, the MAC OS, or UNIX operating system. It will be appreciated that a preferred embodiment may also be implemented on platforms and operating systems other than those mentioned. A preferred embodiment may be written using JAVA, C, and/or C++ language, or other programming languages, along with an object oriented programming methodology. Object oriented programming (OOP) has become increasingly used to develop complex applications.

Figure 3:
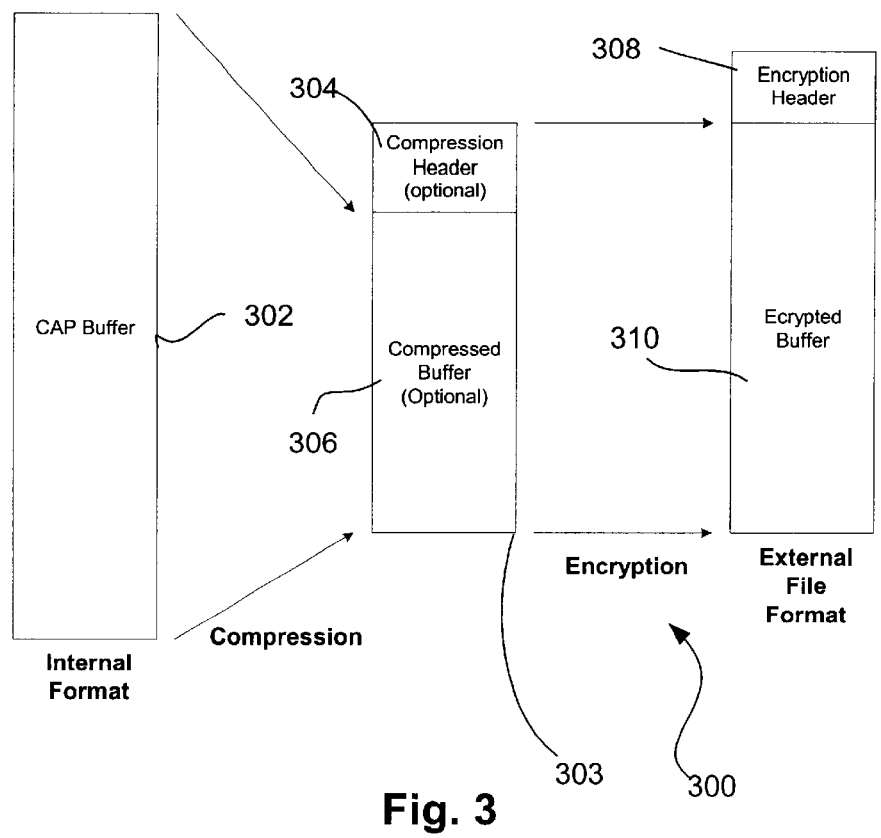
FIG. 3 illustrates a framework that may be implemented in the context of a network analyzer.

FIG. 3 illustrates a framework 300 that may be implemented in the context of the aforementioned network analyzer set forth during reference to FIG. 1. Of course, the framework 300 may be implemented in any desired environment.

As shown, a buffer 302 is included that is adapted for storing network traffic information in any desired format. Such buffer 302 may be resident on any of the devices shown in FIG. 1 as a component of the network analyzer. In one embodiment, such format may include a .CAP format. In the context of the present description, network traffic information may refer to any information collected from a network that facilitates the determination as to why network performance is slow, understanding the specifics about excessive traffic, and/or gaining visibility into various parts of a network.

In one particular embodiment, the network traffic information may include total packet information relating to a total number of packets associated with the network traffic. Further, the network traffic information may include total byte information relating to a total number of bytes associated with the network traffic. Still yet, the network traffic information may include network utilization information relating to network utilization associated with the network traffic.

Further provided is at least one data structure 303. Such data structure 303 may include a data object 306 for containing the network traffic information relating to the network traffic. Such data object 306 may optionally be compressed. A compression object 304 may be provided for describing the compression of the data object 306. As will soon become apparent, the optionally compressed data object 306 is encrypted to form an encrypted data object 310. Associated therewith is an encryption object 308 for describing the encryption of the network traffic information in the encrypted data object 310. As will soon become apparent, the encryption and compression objects may take the form of headers, and may be used to decrypt and decompress the data object 310 by authorized network analyzers.

Figure 4:
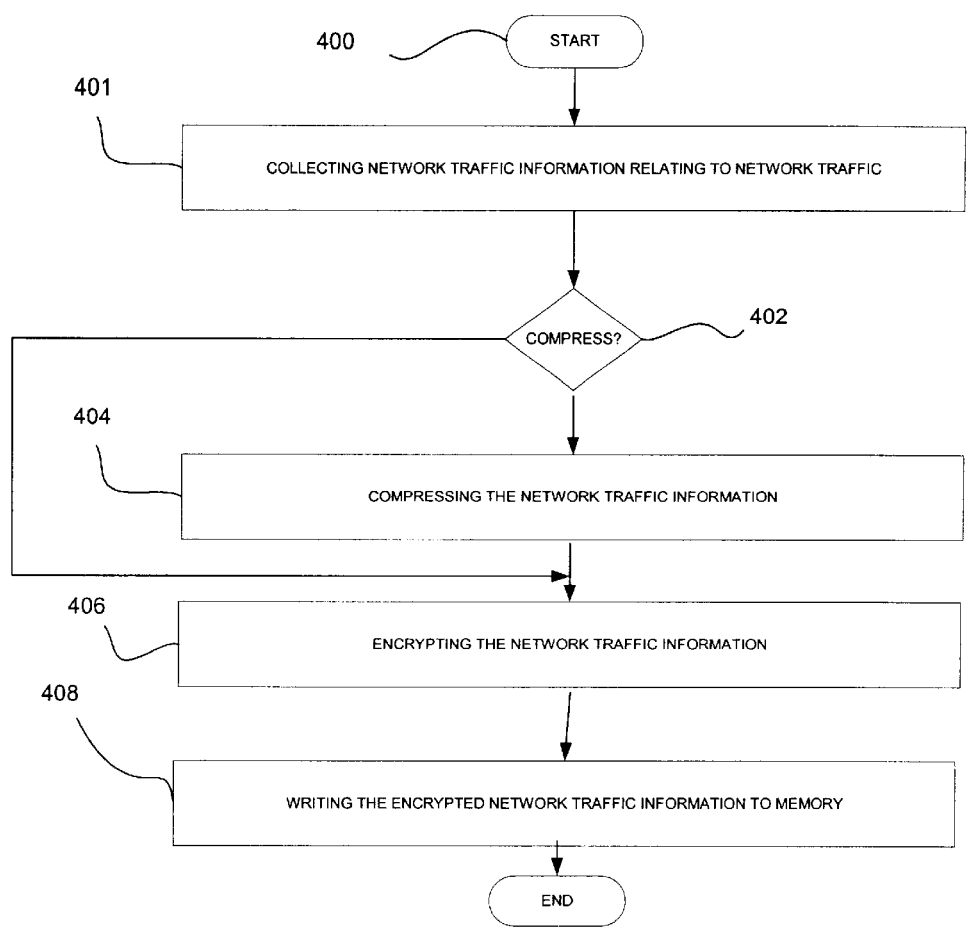
FIG. 4 illustrates a method for collecting, compressing, and encrypting network traffic information, in accordance with one embodiment.

FIG. 4 illustrates a method 400 for collecting, compressing, and encrypting network traffic information, in accordance with one embodiment. As an option, the method 400 may be implemented in the context of the aforementioned framework. Of course, the present method may be implemented in any desired environment.

Initially, network traffic information relating to network traffic is collected in operation 401. An indication may then be received from a user as to whether the network traffic information is to be compressed. See operation 402. As an option, this indication may be conveyed manually via an interface (i.e. check box, etc.). See decision 402. Of course, such decision may be made automatically, or in any other desired manner.

Upon receiving the indication from the user to compress the network traffic information, the network traffic information is compressed. See operation 404. As mentioned earlier, the network traffic information includes a format having a compression header with a compression algorithm field with a compression algorithm used for compressing the network traffic information. As will soon become apparent, this compression header may be used by designated network analyzers for decompressing the network traffic information prior to analysis. More information relating to an exemplary compression header will be set forth during reference to FIG. 6. It should be noted that the compression header may optionally be included even if no compression takes place in order to indicate such lack of compression later when the network traffic information is read from memory for analysis purposes.

Next, in operation 406, the network traffic information is encrypted. The network traffic information includes a format including an encryption header having an encryption field with an encryption algorithm used for encrypting the network traffic information. As will soon become apparent, this encryption header may be used by designated network analyzers for decrypting the network traffic information prior to analysis. More information regarding such fields will be set forth hereinafter during reference to FIG. 7.

Next, in operation 408, the encrypted network traffic information is written to memory. By this design, the network traffic information requires a network analyzer capable of decrypting the network traffic information before analyzing the network traffic utilizing the network traffic information. This therefore prevents unauthorized use of the network traffic information gathered by the network analyzer, and further promotes the security associated with such data.

Figure 5:
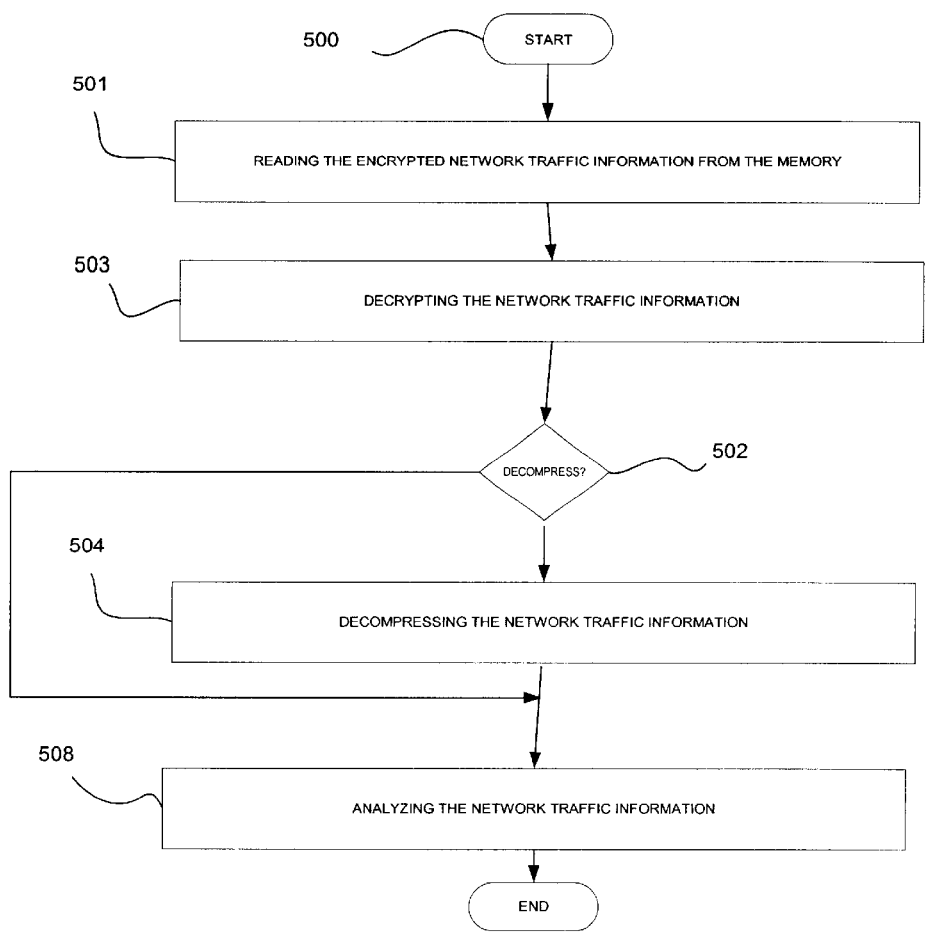
FIG. 5 illustrates a method for decompressing, decrypting, and analyzing network traffic information, in accordance with one embodiment.

FIG. 5 illustrates a method 500 for decompressing, decrypting, and analyzing network traffic information, in accordance with one embodiment. As an option, the method 500 may be implemented in the context of the aforementioned framework. Of course, the instant method may be implemented in any desired environment. In one embodiment, the present method may occur after the operations of the method 400 of FIG. 4 have been carried out.

Initially, encrypted network traffic information may be read from memory utilizing a network analyzer capable of decrypting the network traffic information. See operation 501.

Next, in operation 503, the network traffic information is decrypted utilizing an encryption header. More information on the format of one proposed encryption header and the manner in which it may be used to decrypt network traffic information will be set forth in greater detail during reference to FIG. 7.

Upon the network traffic information being read and decrypted, it is determined whether a compression header indicates that the network traffic information is to be decompressed. See decision 502. Again, more information on the format of one proposed compression header and the manner in which it provides an indication as to whether network traffic information is to be decompressed will be set forth in greater detail during reference to FIG. 6. Upon receiving the indication to decompress the network traffic information, the network traffic information is decompressed utilizing the compression header. Note operation 504.

Once decompressed and decrypted, the network traffic information takes the form of a readable file (i.e. CAP file format) that is analyzed in operation 508. From the perspective of a network analyzer, encrypted network traffic information relating to network traffic is initially read from memory. Thereafter, the network traffic information is optionally decompressed, and then decrypted. Finally, the network traffic information is analyzed.

Figure 6:
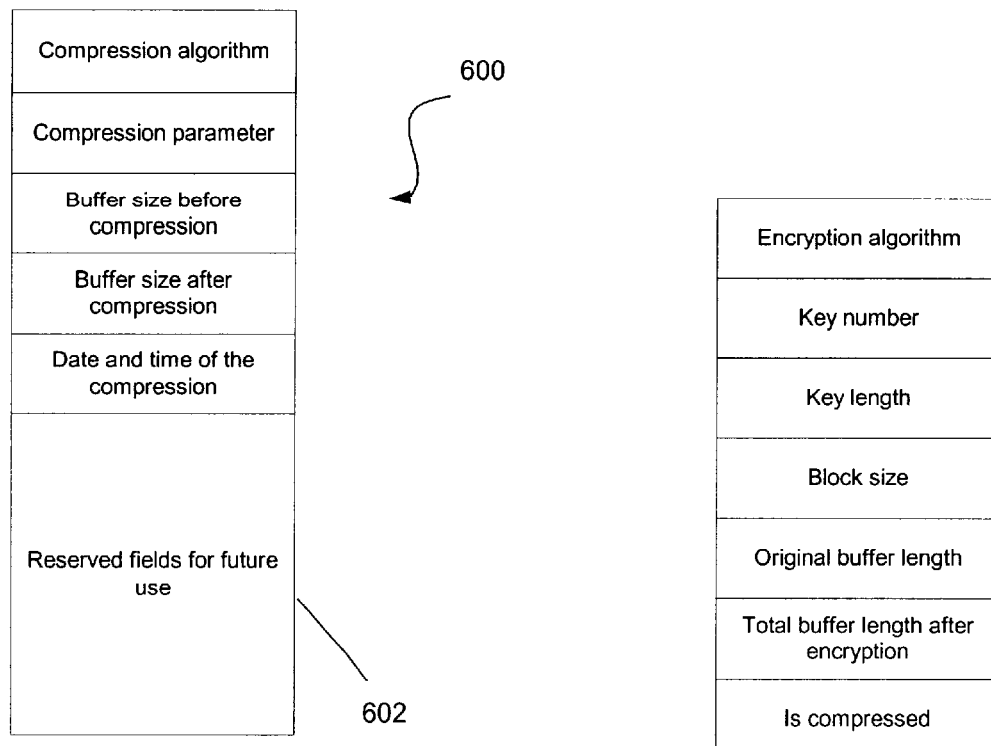
FIG. 6 illustrates an exemplary compression header, in accordance with one embodiment.

FIG. 6 illustrates one example of a compression header 600, in accordance with one embodiment. Of course, any desired compression header may be used per the desires of the user.

As mentioned earlier, the compression of the network traffic information before being encrypted may be an optional step, because the compression and decompression steps may increase the time it takes for reading and writing of the network traffic information. The compression may be done using a Limpel-Zv algorithm, or any other desired mechanism. As mentioned earlier, when the user wants to save a file, the user may be given an option to compress the file before encryption. Optionally, a user interface may have a check box that determines if the file is to be compressed when saving the file. However, when reading the file from memory, this option may be avoided because the encryption header may indicate whether the network traffic information was compressed or not.

As shown, the compression header 600 includes a plurality of fields 602. Included is a compression algorithm field for holding information about the compression algorithm. A parameter field holds the parameter used by the compression algorithm. This field is different for each algorithm.

A pre-compression buffer size field holds the size of the buffer (i.e. CAP buffer) before it is compressed, and the post-compression buffer size field holds the size of the buffer after compressed. There may be a date and time field that holds the time the compression is made.

The last field may be a reserved field. This field may be used for future extensions of the compression algorithm so that new information required by any potential new algorithms may be stored in the compression header without requiring an increase in the size of the compression header. Any unused reserved fields may be set to zero. The size of the compression header may be 256 octets, in accordance with one embodiment.

Figure 7:
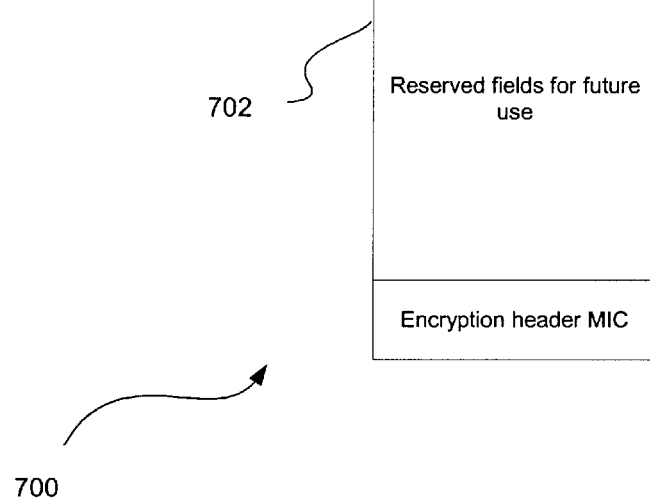
FIG. 7 illustrates an exemplary encryption header, in accordance with one embodiment.

FIG. 7 illustrates one exemplary encryption header 700, in accordance with one embodiment. Of course, any desired encryption header may be used per the desires of the user.

As mentioned earlier, the network traffic information is stored in a file that is written to memory with the encryption header 700 followed by the encrypted data. The encryption header 700 may have a fixed size and various fields that hold the information about the encryption. The contents of the encryption header 700 may be used to decrypt the file when it is read from memory.

As shown in FIG. 7, the encryption header 700 includes an encryption field, a key number field, a key length field, a block size field, a pre-encryption buffer length field, a post-encryption buffer length field, a compressed indicator field, a buffer encryption field, an encryption time field, and a reserved field. Table #1 illustrates a summary of the various fields.

Table #1

Encryption algorithm: The algorithm used to encrypt the capture buffer. The possible algorithms are AES, DES, etc.

Key number: The index associated with the key used for encryption. Each key will have an index that identifies it uniquely. This may be the index into the array of the keys. Its valid range may be from 0 to the (number of keys—1). Number of available keys may be chosen large enough to make it very difficult for the cryptanalysts to determine the key used for encryption. The key used for encryption may be randomly selected from all available keys.

Key length: The length of the key used by the encryption algorithm. The range of value may be from 56 to 256 bits. The default key length may be 128 bits. The program may have a list of a number of keys each with a length of 256 bits. If an algorithm uses a key length N<256 bits it may use the first N bits of the selected key. The keys may be determined randomly when the implementation is completed, and may be hard coded and compiled in to the product, and may never change. The use of anti-piracy software may be used to protect the integrity and privacy of the keys against piracy efforts.

Block size: The encryption algorithm chosen for this implementation uses fixed data block sizes. This field may hold the size of the blocks used during encryption.

Original buffer length: The size of the encrypted buffer in bytes prior to encryption.

Total buffer length after encryption: The size of the encrypted buffer in bytes after encryption. Includes padding bytes.

Is compressed: This field contains a flag that indicates if the file is compressed before encryption.

Buffer encryption MIC: The message integrity code (MIC) of the encrypted data prior to encryption. This provides the ability to detect that the content of the encrypted buffer is not modified.

Date and time of encryption: This field holds the date and time of the encryption.

Reserved field: This field insures that the encryption header size is maintained at 256 octets. It may hold the fields that may be added to the encryption header for future extensions. The unused fields may be set to zero.

Encryption header MIC: The message integrity code (MIC) of the encryption header. This provides the ability to detect that the content of the encrypted header is not modified.

There are a number of available encryption algorithms that may be used in the context of the present embodiment. Following are various algorithms that may potentially be used in accordance with a few exemplary implementations. Of course, any desired encryption algorithm may be used per the desires of the user.

Advanced Encryption Standard (AES)

The Advanced Encryption Standard (AES) is an approved standard for encryption by the US government. AES is a symmetric block cipher algorithm. The same key is used for both encryption and decryption. The AES algorithm is approved for the key sizes of 128, 196 and 256 bits even though the underlying algorithm can be expanded to work with other key sizes. The block size for any of the above key sizes is 128 bits.

The default key size for AES may be 128-bit due to export restrictions. However, if 196 and 256-bit key sizes are approved for export in future, the default key lengths may be expanded without significant changes to the present invention.

The AES algorithm is a block cipher algorithm that uses 128 bits as the block size. The resulting encrypted data length is a multiple of 128 bits regardless of the original length of the captured network traffic information. Padding of the data to 128 bit lengths may be required in order to make the buffer size multiple of 128 bits before encryption. The encryption header may contain the length of the original capture buffer data in bytes prior to padding. Padding data may be ignored upon completion of the decryption process.

Given that the minimum key size available in AES is 128 bits, export restrictions may prevent delivery to certain countries. Therefore, an alternative encryption approach using shorter key lengths may be used in such cases.

The Data Encryption Standard (DES)

The Data encryption Standard (DES) has been the most widely used encryption scheme until it recently was replaced by AES. The relatively short key length and small block size make the DES algorithm vulnerable to cryptanalysis attacks. Therefore, other algorithms should be used when the high security is concerned. DES may be used in cases where export limitations prevent the use of 128 bit encryption algorithms.

The DES algorithm transforms 64-bit input blocks into 64-bit output blocks. The key size is 56 bits. There are many implementations of DES available in the industry.

Regardless of what particular type of encryption algorithm is used, the encryption algorithm may be implemented in a separate library in the form of a DLL. Any network analyzer or related tool that is authorized to analyze the network traffic information must be equipped with a software module with such a library or the like.

The software design of this software module may employ some form of authentication to avoid unauthorized use of the software module. The details of this authentication between the network analyzer and the software module may take any desired form. One possible method may employ the use of a challenge/response mechanism for each request of the software module. In this example, a third party application may be required to provide a callback function that would be called by the software module when a software module request occurs. The software module may present a random challenge text to the callback function. The callback function may execute an MD5 hash on the challenge text using a predetermined secret. The callback function may then return this hash value response to the software module within a certain period of time. Each software module request may require a unique response and if this response is not satisfied correctly by the user callback function, the original software module conversion request will fail. Of course, other methods to authenticate software module execution requests may be considered.

The present techniques thus provide a method by which a file of network traffic information may be optionally compressed and then encrypted before writing it to a new file format. Such new format may use encryption algorithms utilizing keys with varying lengths that are known only to designated network analyzer products. A software library in DLL format may provide both read and/or write access to this data file format to authorized third party tools. This software library may also be licensed to third party developers using anti-piracy software (i.e. PACE) to allow unlimited or limited authorization to this new file format.

This anti-piracy software prevents unwanted debugging and access to the encryption algorithm. In addition, all of the encryption keys stored in the software may be unavailable because this anti-piracy software encrypts all executables. Further, the anti-piracy software eliminates the capability for hackers to reverse engineer portions of executables files.

Further, the anti-piracy software may provide limited authorization that includes limited time (expiration date)

and/or limited executions (total number of trace file imports and exports). In addition, the DLL may be used to create a use-based service that may convert customer provided trace files from a first format to a second format [i.e. Sniffer® Capture File (SCF) to CAP and/or CAP to SCF] on a per request basis. The use of anti-piracy software in products allows licensed authorization to legacy file formats to end users wishing to have the option for promiscuous file interchange. This can be made available to selected end-users via updated license key authorizations using the anti-piracy software when it is integrated into future designated products.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. The method as recited in claim 4, wherein the network traffic information is selected from the group consisting of total packet information relating to a total number of packets associated with the network traffic, total byte information relating to a total number of bytes associated with the network traffic, and network utilization information relating to network utilization associated with the network traffic.

2. The method as recited in claim 1, wherein the network traffic information includes total packet information relating to a total number of packets associated with the network traffic, total byte information relating to a total number of bytes associated with the network traffic, and network utilization information relating to network utilization associated with the network traffic.

3. The method as recited in claim 1, wherein the network traffic information is compressed before being encrypted.

4. A method for analyzing a network, comprising:
   collecting network traffic information relating to network traffic; and
   encrypting the network traffic information;
   wherein the network traffic information is capable of being analyzed by a network analyzer adapted for decrypting the network traffic information;
   wherein the network traffic information is compressed;
   wherein the network traffic information includes a format including a compression header having a compression algorithm field with a compression algorithm used for compressing the network traffic information.

5. The method as recited in claim 1, wherein the compression header further includes a compression parameter field, a pre-compression buffer size field, a post-compression buffer size field, a compression time field, and a reserved field.

6. The method as recited in claim 1, wherein the compression header further includes fields selected from the group consisting of a compression parameter field, a pre-compression buffer size field, a post-compression buffer size field, a compression time field, and a reserved field.

7. The method as recited in claim 1, and further comprising writing the encrypted network traffic information to memory.

8. The method as recited in claim 7, and further comprising reading the encrypted network traffic information from the memory utilizing the network analyzer capable of decrypting the network traffic information.

9. The method as recited in claim 8, and further comprising analyzing the decrypted network traffic information.

10. The method as recited in claim 4, wherein the network traffic information is encrypted utilizing one of a plurality of keys.

11. A method for analyzing a network, comprising:
    collecting network traffic information relating to network traffic; and
    encrypting the network traffic information;
    wherein the network traffic information is capable of being analyzed by a network analyzer adapted for decrypting the network traffic information;
    wherein the network traffic information includes a format including an encryption header having an encryption field with an encryption algorithm used for encrypting the network traffic information.

12. The method as recited in claim 11, wherein the encryption header further includes a key number field, a key length field, a block size field, a pre-encryption buffer length field, a post-encryption buffer length field, a compressed indicator field, a buffer encryption field, an encryption time field, and a reserved field.

13. The method as recited in claim 11, wherein the encryption header further includes fields selected from the group consisting of a key number field, a key length field, a block size field, a pre-encryption buffer length field, a post-encryption buffer length field, a compressed indicator field, a buffer encryption field, an encryption time field, and a reserved field.

14. The method as recited in claim 4, and further comprising receiving an indication from a user as to whether the network traffic information is to be compressed.

15. The method as recited in claim 14, and further comprising compressing the network traffic information upon receiving the indication from the user to compress the network traffic information.

16. A computer program product embodied on a computer readable medium for analyzing a network, comprising:
    (a) computer code for collecting network traffic information relating to network traffic; and
    (b) computer code for encrypting the network traffic information;
    (c) wherein the network traffic information is capable of being analyzed by a network analyzer adapted for decrypting the network traffic information;
    wherein the network traffic information includes a format including an encryption header having an encryption field with an encryption algorithm used for encrypting the network traffic information.

17. A system for analyzing a network, comprising:
    (a) logic for collecting network traffic information relating to network traffic; and
    (b) logic for encrypting the network traffic information;
    (c) wherein the network traffic information is capable of being analyzed by a network analyzer adapted for decrypting the network traffic information;
    wherein the network traffic information includes a format including an encryption header having an encryption field with an encryption algorithm used for encrypting the network traffic information.

18. A system for analyzing a network, comprising:
    (a) means for collecting network traffic information relating to network traffic; and
    (b) means for encrypting the network traffic information;
    (c) wherein the network traffic information is capable of being analyzed by a network analyzer adapted for decrypting the network traffic information;

wherein the network traffic information includes a format including an encryption header having an encryption field with an encryption algorithm used for encrypting the network traffic information.

19. A data structure stored in a computer readable medium for analyzing a network, comprising:
   (a) a data object embodied on a computer readable medium for containing network traffic information relating to network traffic, wherein the data object is encrypted; and
   (b) an encryption object for describing the encryption of the network traffic information in the data object;
   wherein the network traffic information includes a format including an encryption header having an encryption field with an encryption algorithm used for encrypting the network traffic information.

20. A method for analyzing a network, comprising:
   (a) reading encrypted network traffic information relating to network traffic;
   (b) decrypting the network traffic information; and
   (c) analyzing the network traffic utilizing the decrypted network traffic information;
   wherein the network traffic information includes a format including an encryption header having an encryption field associated with an encryption algorithm used for encrypting the network traffic information.

21. A method for analyzing a network, comprising:
   (a) collecting network traffic information relating to network traffic, wherein the network traffic information is selected from the group consisting of total packet information relating to a total number of packets associated with the network traffic, total byte information relating to a total number of bytes associated with the network traffic, and network utilization information relating to network utilization associated with the network traffic;
   (b) receiving an indication from a user as to whether the network traffic information is to be compressed;
   (c) compressing the network traffic information upon receiving the indication from the user to compress the network traffic information, wherein the network traffic information includes a format including a compression header having a compression algorithm field with a compression algorithm used for compressing the network traffic information, and the compression header further includes a compression parameter field, a pre-compression buffer size field, a post-compression buffer size field, a compression time field, and a reserved field;
   (d) encrypting the network traffic information, wherein the network traffic information includes a format including an encryption header having an encryption field with an encryption algorithm used for encrypting the network traffic information, and the encryption header further includes a key number field, a key length field, a block size field, a pre-encryption buffer length field, a post-encryption buffer length field, a compressed indicator field, a buffer encryption field, an encryption time field, and a reserved field;
   (e) writing the encrypted network traffic information to memory;
   (f) reading the encrypted network traffic information from the memory;
   (g) decrypting the network traffic information utilizing the encryption header;
   (h) receiving an indication from the compression header as to whether the network traffic information is to be decompressed;
   (i) decompressing the network traffic information utilizing the compression header upon receiving the indication to decompress the network traffic information; and
   (j) analyzing the network traffic information.

22. A computer program product embodied on a computer readable medium for analyzing a network, comprising:
   computer code for reading encrypted network traffic information relating to network traffic;
   computer code for decrypting the network traffic information; and
   computer code for analyzing the network traffic utilizing the decrypted network traffic information;
   wherein the network traffic information includes a format including an encryption header having an encryption field associated with an encryption algorithm used for encrypting the network traffic information.

23. The computer program product as recited in claim 22, wherein the network traffic is analyzed at a plurality of layers.

24. The computer program product as recited in claim 22, wherein the network is analyzed for determining reasons why a network performance is slow.

25. The computer program product as recited in claim 22, wherein the network is analyzed for understanding excessive traffic.

26. The computer program product as recited in claim 22, wherein the network is analyzed for gaining visibility into various parts of the network.

* * * * *